US006243458B1

(12) United States Patent
Fellner et al.

(10) Patent No.: US 6,243,458 B1
(45) Date of Patent: *Jun. 5, 2001

(54) METHOD AND SYSTEM FOR CALL TRACING

(75) Inventors: Paul W. Fellner, Crystal Lake, IL (US); James F. Langdon, Oconomowoc, WI (US)

(73) Assignee: Ameritech Services, Inc., Hoffman Estates, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/429,576

(22) Filed: Oct. 28, 1999

Related U.S. Application Data

(63) Continuation of application No. 09/061,926, filed on Apr. 17, 1998, now Pat. No. 5,999,616.

(51) Int. Cl.⁷ .............................. H04M 1/57; H04M 7/00; G09G 5/00; H04Q 3/72; H04Q 7/08
(52) U.S. Cl. .............................. 379/247; 345/2; 379/142; 379/219; 379/249; 455/31.2
(58) Field of Search .............................. 345/2; 379/127, 379/142, 219, 242, 245, 246, 247, 249; 455/31.2

(56) References Cited

U.S. PATENT DOCUMENTS

| | | | |
|---|---|---|---|
| 3,795,774 | * | 3/1974 | Talbot .............................. 379/249 X |
| 3,904,830 | * | 9/1975 | Every, Sr. et al. .............................. 379/142 |
| 3,997,732 | * | 12/1976 | Every, Sr. et al. .............................. 379/142 X |
| 4,464,543 | * | 8/1984 | Kline et al. .............................. 379/247 X |
| 4,591,665 | | 5/1986 | Foster et al. .............................. 379/142 |
| 4,754,475 | | 6/1988 | Pintos et al. .............................. 379/142 |
| 4,914,689 | | 4/1990 | Quade et al. .............................. 379/142 |
| 5,546,448 | | 8/1996 | Caswell et al. .............................. 379/142 |
| 5,644,626 | | 7/1997 | Carlsen et al. .............................. 455/31.2 |
| 5,659,604 | * | 8/1997 | Beckmann .............................. 379/246 X |
| 5,668,852 | | 9/1997 | Holmes .............................. 455/31.2 |
| 5,692,038 | | 11/1997 | Kraus et al. .............................. 379/142 |
| 5,694,453 | | 12/1997 | Fuller et al. .............................. 455/31.2 |
| 5,844,522 | * | 12/1998 | Sheffer et al. .............................. 455/32.1 X |
| 5,930,344 | * | 7/1999 | Relyea et al. .............................. 379/247 X |

OTHER PUBLICATIONS

*Call Trace*, "Crosslake Telephone & Cablevision Company," (Jan., 1998) (1 page).
*Tame Your Telephone. . . with Advanced Calling Services from VTCI*, "VTCI Advanced Calling Services," (Jan., 1998) (1 page).
*Advanced Custom Calling Features*, "North Pittsburgh Telephone Company," (Jan., 1998) (2 pages).

* cited by examiner

*Primary Examiner*—Harry S. Hong
(74) *Attorney, Agent, or Firm*—Brinks, Hofer Gilson & Lione

(57) ABSTRACT

The present invention is drawn to a call trace system and method that is simple to establish in a short amount of time. The call trace is implemented through a Web browser page which remotely programs central offices to trace calls to particular number. When a trace is established a message is sent back to the Web browser which displays the calling number, the called number and the central office detecting the call. Also, a page is sent to a pager which displays the traced information.

23 Claims, 9 Drawing Sheets

Ameritech Call Tracer

Enter The Telephone number ☐—42

Select The State:
○ Illinois   ○ Indiana   ○ Michigan   ○ Ohio   ○ Wisconsin
                                                              ↘ 44
Enter Your Login: ☐—46

Enter Your Password: ☐—48

50—[ submit ]   [ resist ]—52

|000098|—54

Call Trace File (Switch Format)—56

 
Ameritech Call Tracer
Enter The Telephone number ☐ — 42
Select The State:
○ Illinois   ○ Indiana   ○ Michigan   ○ Ohio   ○ Wisconsin
                                                          \
                                                           44
Enter Your Login: ☐ — 46
Enter Your Password: ☐ — 48
50 — [submit]   [resist] — 52
[000098] — 54
Call Trace File (Switch Format) — 56
*Fig. 5*

Calltrace Confirmation

Number to be Traced = 4146785873 —— 60

State Trace will be placed = Illinois —— 62

[correct] —— 64

58

*Fig. 6* peorilpjdc1 Good Calltrace Entry 4146785873
pkfsilpfdc0 Good Calltrace Entry 4146785873
peorilpbdc0 Good Calltrace Entry 4146785873
refrilredc0 Good Calltrace Entry 4146785873
oflnilmqdc1 Good Calltrace Entry 4146785873
refrilrtdc1 Good Calltrace Entry 4146785873
refrilrtdc0 Good Calltrace Entry 4146785873
rvgvilrgdc0 Good Calltrace Entry 4146785873
scbgilcodc0 Good Calltrace Entry 4146785873
scbgilrsdc0 Good Calltrace Entry 4146785873
smmtilsmdc0 Good Calltrace Entry 4146785873 — 102
spfdilesdc1 Good Calltrace Entry 4146785873
spfdilesdc2 Good Calltrace Entry 4146785873
whtnilwhdc0 Good Calltrace Entry 4146785873
wdstilwsdc0 Good Calltrace Entry 4146785873
spfdilesdc0 Good Calltrace Entry 4146785873 — 102
spfdilsldc0 Good Calltrace Entry 4146785873
rcisilridc1 Good Calltrace Entry 4146785873
spfdilswdc0 Good Calltrace Entry 4146785873
cenlilcedc0 Failed to Login into Switch: Failed to enter 4146785873 failed to receive login prompt
wtskilwtdc0 Good Calltrace Entry 4146785873
bntoilagdc0 Good Calltrace Entry 4146785873
bgbkilbkdc0 Good Calltrace Entry 4146785873
oklwiloldc0 Good Calltrace Entry 4146785873
lemtilIndc0 Good Calltrace Entry 4146785873 — 102
arihilahdc0 Good Calltrace Entry 4146785873
chcgillrdc0 Good Calltrace Entry 4146785873
chcgilladc0 Good Calltrace Entry 4146785873
chcgilcadc1 Good Calltrace Entry 4146785873
hgpkilhpdc0 Failed to Login into Switch: Failed to enter 4146785873 failed to receive login prompt
chcgilpmdc0 Good Calltrace Entry 4146785873
chcgilwbdc2 Good Calltrace Entry 4146785873
hfesilwldc0 Good Calltrace Entry 4146785873
chcgilmode1 Good Calltrace Entry 4146785873 — 104
plfdilpldc0 Failed to enter 4146785873 into calltrac list — 104
rsllilrzdc0 Failed to enter Entry 4146785873 into calltrac list — 104

*Fig. 7*

METHOD AND SYSTEM FOR CALL TRACING

"This is a continuation of application Ser. No. 09/061,926, filed Apr. 17, 1998 now U.S. Pat. No. 5,999,616."

APPENDIX

Attached hereto is a Source Code Appendix which consists of pages A-1 through A-46.

FIELD OF THE INVENTION

The present invention relates to a method and system for call tracing, and, more particularly, to an automated method and system for quickly and simply establishing and removing a trace on a telephone line.

BACKGROUND OF THE INVENTION

Known methods and systems for establishing a trace on an identified telephone number have, in general, been cumbersome and time-consuming thereby, often wasting valuable time in a situation where time is of the essence. More particularly, some known methods and systems for establishing a trace require manually programming central office switches in a geographic area. For example, if a trace is to be established for calls originating in the Chicago area, such a task typically requires three persons about three hours each to manually perform the task. This wastes precious time in a situation, such as a kidnapping, where time can not be wasted. In addition, as with any system that requires manual programming, errors may be made which would compromise the trace and lead to valuable information being lost.

Other known call tracing methods and systems require that an incoming call actually be answered and that the answering party initiate the trace. For example, U.S. Pat. No. 4,591,665 (Foster et al.) disclose a method of providing customer originated call tracing. If a customer receives an obscene or nuisance call, for example, the customer enters a code indicating that such a call has been received. The identity of the calling party is identified to authorities in response to the action by the customer. Such a system has obvious drawbacks including the potential for abuse by a called party. Such abuse would waste valuable time on the part of the authorities and detract authorities from where their resources are most needed. Other systems use a caller identification type of tracing commonly referred to as caller i.d. U.S. Pat. No. 4,754,475 (Pintos et al.) discloses a calling line tracing system and identification detector which identifies of a calling party without the called party ever lifting the telephone receiver. Other systems forward an incoming call to a called party's pager including caller i.d.-type information. See, for example, U.S. Pat. Nos. 5,644,626 (Carlsen et al.); 5,692,038 (Kraus et al.) and 5,694,453 (Fuller et al.). A drawback with such caller i.d. type devices is that the calling party may block the identification of the calling number typically by entering a code using the keypad of a phone before a call is made.

It is thus desirable to provide a call tracing method and system that is simple to implement, significantly reduces the time for its implementation, and provides accurate information in less time than known call tracing methods and systems. It is also desirable to provide a call tracing method and system that can cancel an implemented call trace quickly. It is also desirable to provide an automated call tracing method and system that can be automatically implemented and canceled at a site remote from the switches of central offices thereby eliminating direct manual programming of the switches at the central offices. It is also desirable to provide a call tracing method and system that does not require any action by the called party.

SUMMARY OF THE INVENTION

According to a first aspect of the invention there is provided a method for tracing a call. The method includes the steps of:

(a) displaying a log-on screen on a display device, the log-on screen having a plurality of fields requiring input data including a telephone number field;

(b) inputting a telephone number in the telephone number field wherein the telephone number represents the number to be traced;

(c) establishing a call trace in a plurality of central offices;

(d) displaying a confirmation screen on the display device, the confirmation screen indicating whether the trace was successfully established or not in each of the plurality of central offices; and (e) indicating that a call has been made to the telephone number input in step (b).

According to a second aspect of the invention there is provided a method for tracing a call. The method includes the steps of:

(a) simultaneously designating at least one telephone number to be traced in a plurality of central offices;

(b) monitoring incoming calls at said plurality of central offices;

(c) determining when an incoming call at one of said plurality of central offices matches the at least one telephone number designated in step (a); and (d) if it is determined in step (c) that an incoming call at one of said plurality of central offices matches the at least one telephone number designated in step (a), then indicating that a match has occurred.

According to a third aspect of the invention there is provided a system for tracing calls. The system includes:

a processor;

a plurality of central offices coupled to the processor for sending messages to the processor and receiving messages from the processor;

wherein the processor is programmed to run the following call tracing routine;

receiving a message identifying a telephone number to be traced;

transmitting a command to the plurality of central offices to establish a trace on the identified telephone number;

transmitting a trace found message to a display device when any one of the plurality of central offices detects that the identified telephone number has been called.

According to a fourth aspect of the invention there is provided a call trace process performed by a computer network. The process includes the steps of:

a first party identifying a telephone number to be traced;

the first party sending a call trace activation message to the computer network authorizing the activation of a call trace, the message also including the telephone number to be traced;

the computer network sending a call trace activator message to a central office coupled to the computer network;

the central office sending a call trace found message to the computer network whenever an incoming call is matched to the telephone number to be traced;

the computer network sending a call trace information message to the first party wherein the call trace information message includes an identification of the telephone number of the incoming call.

BRIEF DESCRIPTION OF THE DRAWINGS

FIGS. 5–7 illustrate various screens that appears on a display device.

DETAILED DESCRIPTION OF THE PRESENTLY PREFERRED EMBODIMENTS

Figure 1:
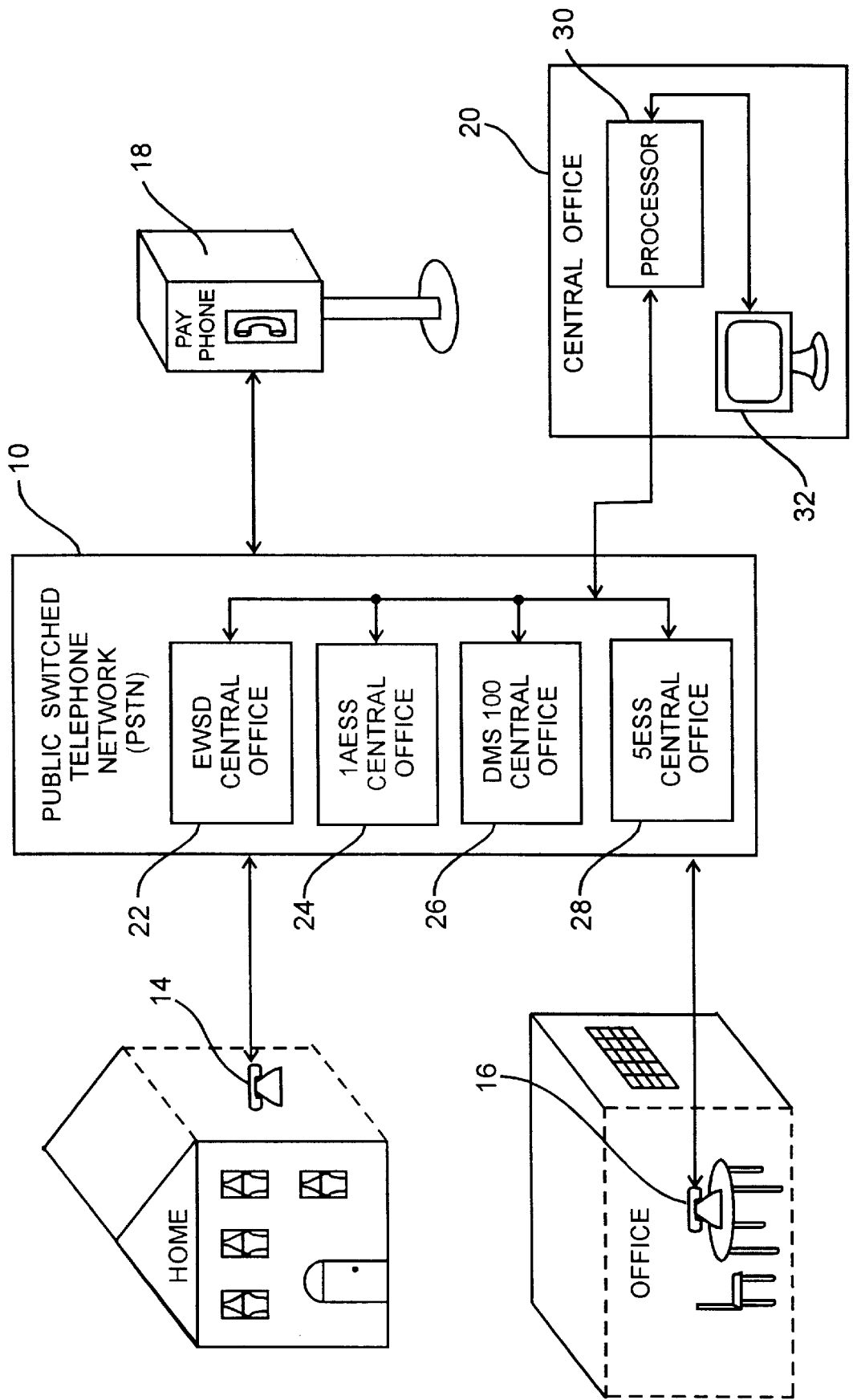
FIG. 1 is a block diagram illustrating the various interfacing equipment of a preferred embodiment of the call tracing method and system of the present invention.

FIG. 1 is a block diagram illustrating the various interfacing equipment of a preferred embodiment of the call tracing system and method of the present invention. The present invention is implemented in a preexisting telephone infrastructure. The infrastructure includes a public switched telephone network (PSTN) 10; and telephones 14, 16, 18 located at various geographic locations such as a home, office or payphone stand, respectively, coupled to the PSTN 10 so that they may communicate with one another as is well known in the art. The PSTN 10 includes central offices scattered at various geographic locations as well as other equipment which is well known to those of ordinary skill in the art. The central offices are categorized according to the telephone technology employed in the central offices. For example, central office 22 may be an EWSD type central office, central office 26 may be a DMS100 type central office and central office 28 may be a 5ESS type central office. Although one block is illustrated in FIG. 1 for each type of central office there of course would be a plurality of such offices scattered at various geographic location as is well known to those of ordinary skill in the art.

A control office 20 is also coupled to the PSTN 10. The control office 20 includes a processor 30 and a display unit 32 coupled thereto. As will be described in detail hereinafter, in this preferred embodiment it is in the control office 20 that a method for automated call tracing is implemented. The processor 30 sends messages to and receives messages from the central offices 22, 24, 26, 28 as will be described in detail hereinafter. In general, the processor 30 runs a call trace program which programs switches (not shown) in the central offices to monitor calls made to an identified number. Each central office returns a message to the processor 30 indicating whether the trace was successfully placed. When a call is made to the traced number, the central office which handles the call sends a message to the processor 30 indicating that a trace was made which includes preferably the number from which the call was placed and the central office which detected the call as well as the traced number.

Figure 2:
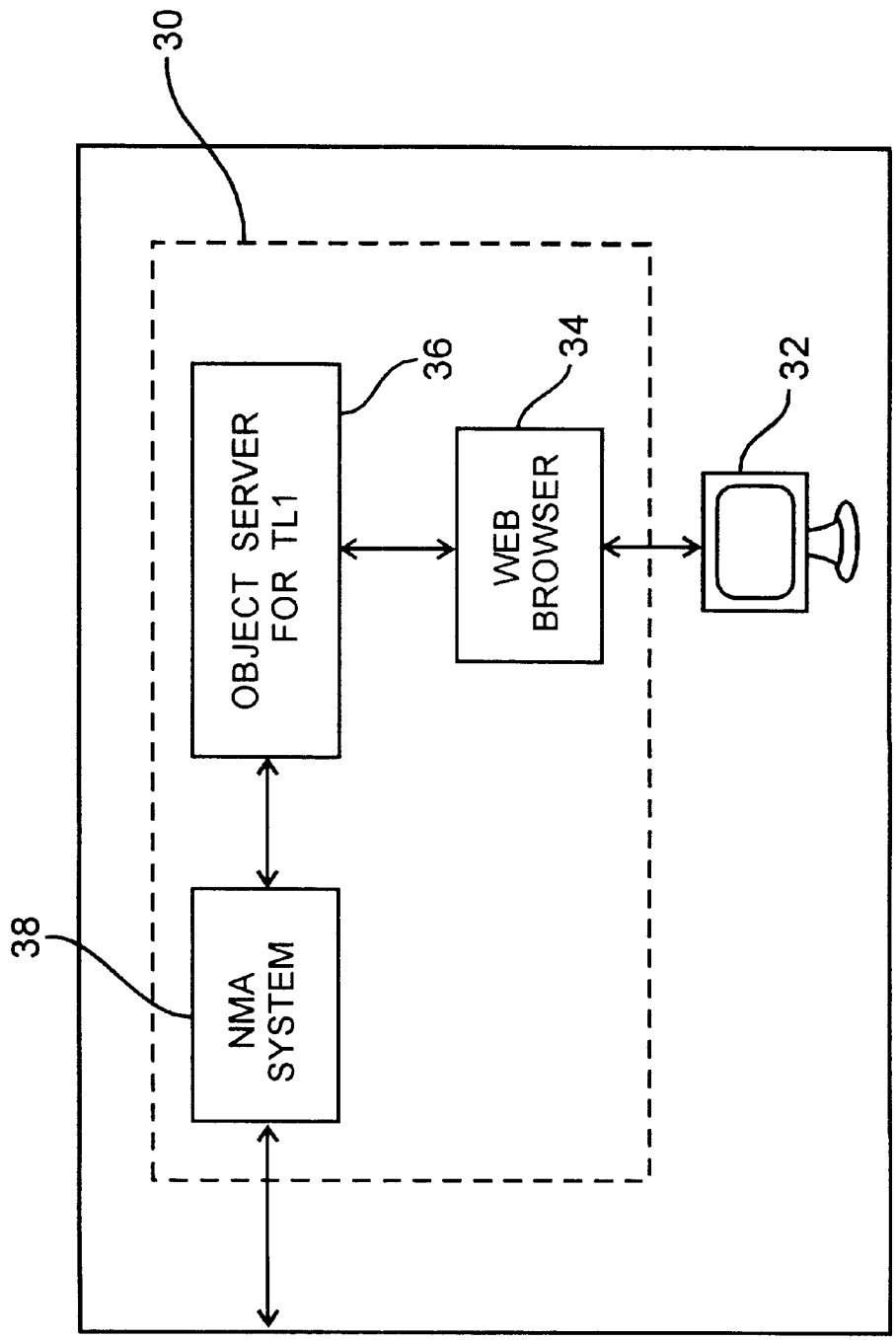
FIG. 2 is a detailed block diagram of the control office.

FIG. 2 is a detailed block diagram of the control office 20. In a preferred embodiment the processor 30 includes a Web browser 34, an object server 36 and a network monitoring and analysis system ("NMA system") 38. The Web browser 34 operates in an object-oriented language such as Pearl while the NMA system 38 operates in transactional language such as transactional language 1 (TL1) protocol. The object server 36 provides compatibility between the Web browser 34 and the NMA system 38 and preferably operates in an object-oriented language such as HTML or Pearl. In a preferred embodiment the processor 30 includes a Unix platform housing the Web browser 34 and object server 36 and a Stratus computer on which an application ("NMA application") implementing the NMA system is loaded. The NMA application is available from Bellcore of New Jersey.

Figure 3:
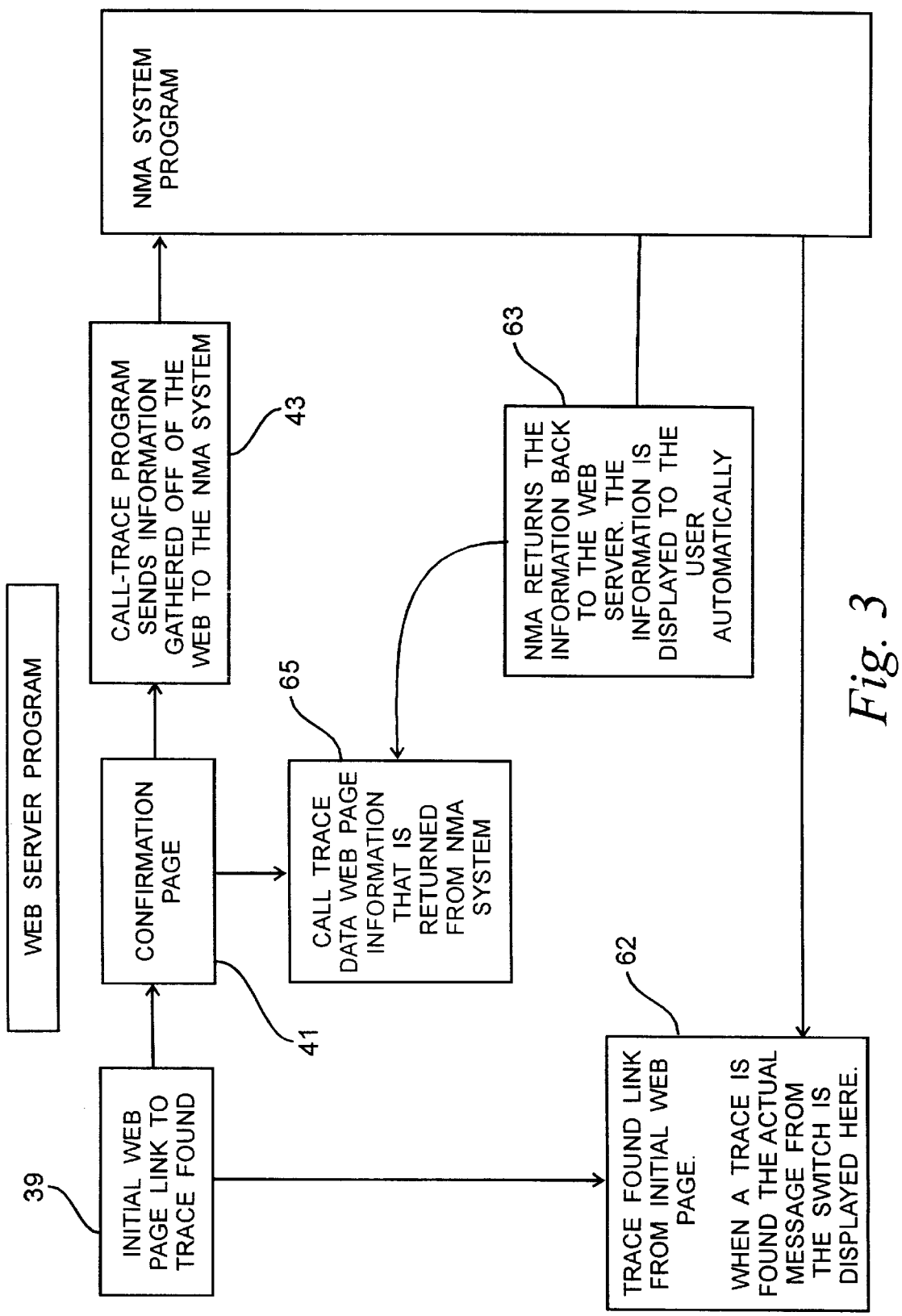
FIGS. 3 and 4 illustrate the command and message flow pattern between the control office and the public switched telephone network.
Figure 4:
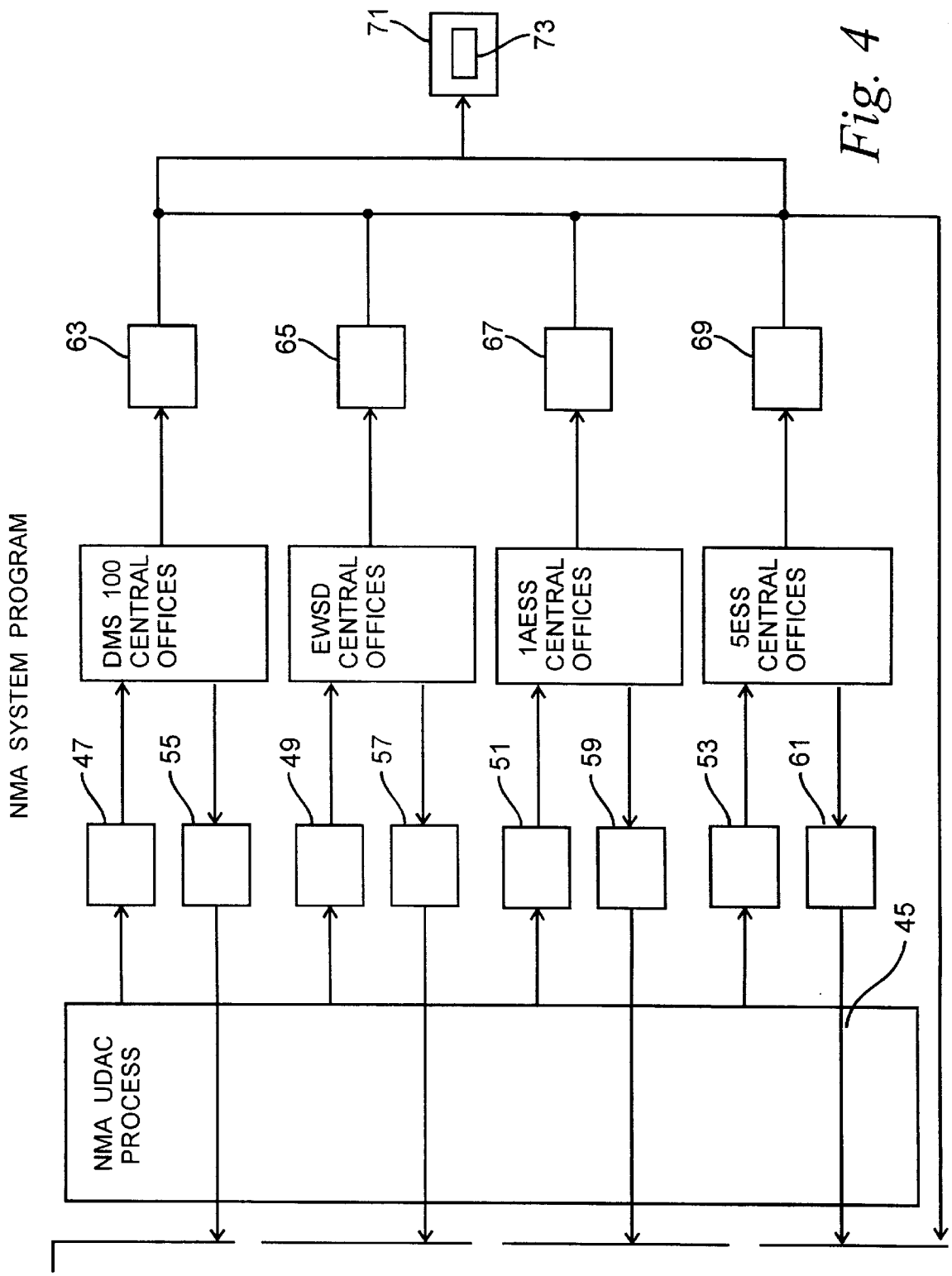

A call trace is preferably initiated through a Web browser page. FIGS. 3 and 4 illustrate the command and message flow pattern between the control office 20 and the PSTN 10. FIG. 3 represents the Unix platform side of the process which implements the Web browser and object server and FIG. 4 represents the Stratus computer side of the process which implements the NMA system. Beginning with FIG. 3 at block 39 an initial Web page is displayed on the display unit 32. FIG. 5 illustrates the initial Web page in the form of a log-on screen 40 that appears on the display device 32. The log-on screen 40 preferably includes a plurality of fields that either require input from the user or display output. For example, the input fields include a telephone number field 42 that requires the user to input the telephone number on which a trace is to be placed. In addition there is a geographic location field 44 which, in the preferred embodiment illustrated, indicates a choice of five states. Of course more or less states may be listed. In the geographic location field 44 the user selects which geographic area is to be monitored for incoming calls made to the traced phone number. For example, it may be desired to monitor calls made in Illinois to the traced number. The user may select one geographic area, a plurality of geographic areas or all of them depending on the desired scope of surveillance. A login field 46 and password field 48 may be provided. Once all of the required information is input by the user and the user is satisfied with the input values selected, the user clicks on a submit button 40 to begin the implementation of a call trace. A reset button 42 allows the user to clear the logon screen and re-input data. Once the user submits the information on the log-on screen a new confirmation screen appears as indicated at block 41 of FIG. 3. FIG. 6 illustrates the confirmation screen 58. The confirmation screen 58 lists the number to be traced at line 60 and the geographic area where the trace will be placed at line 62. The user has the option at the confirmation screen 58 to either activate the call trace or cancel it. If the user clicks on the correct button 46, the call trace is activated.

Returning to FIG. 3, the NMA system is continuously running a program called file$_{13}$checker which gathers information entered in the log on and confirmation screens and sends that information to the NMA system as indicated at block 43. Referring to FIG. 4 at block 45 the NMA system runs a call trace program. At block 45 separate messages are created for each type of central office. For example, a DMS100 Trace Process Trace message 47 is sent to every DMS 100 central office in the geographic area selected. A EWSD Trace Process Trace message 49 is sent to every EWSD central office in the geographic area selected. A 1AESS Trace Process Trace message 51 is sent to every 1AESS control office in the geographic area selected. A 5ESS Trace Process Trace message 53 is sent to every 5ESS control office in the geographic area selected. Each of the central offices contacted returns a message 55, 57, 59 and 61 respectively to the Web server at block 63 indicating whether the trace was successful or not. The information is automatically displayed on the display unit at block 65. FIG. 7 illustrates a display screen of the returned information 100. It can be seen at lines 102 that a call trace was successfully implemented in a particular central office. At lines 104 it is indicated that a call trace was not successfully established. Different switch types may have different reasons for failing. For example, in the 1AESS central offices the 1A switch types must enter the number twice due to a problem in determining if the number is local or long distance. The number in the 1A case must be preceded with a 0 or 2 depending if it is local or long distance. The program according to a preferred embodiment of the present invention returns the results of both attempts. In the case of 5ESS central offices and the 5E switches the program needs to determine if the NPA of the 5ESS central office is the same as the NPA of the trace number and if a 7 digit number is entered into the switch. The DMS100 central office and DMS switches require a login and password and may fail this step in the process.

With the trace now in place, the central offices monitor for incoming calls made to the number placed on trace. Messages are automatically collected at the central offices, and when the traced number is called, an output message 63, 65, 67 or 69 depending on which central office detected the incoming call is passed to a trace found program. The trace found program reformats the message and sends the information to a Sfax program which generates an alphanumeric page to a security pager 71 in the following format:

"Trace found ### ### #### number called ### ### #### from XXXXXXXXXX central office."

The pager 71 displays the message on a display screen 73 of the pager 71. The message 63, 65, 67 or 69 generated by the central office is also sent back to the Web server at block 62. The initial logon screen 40 is displayed on the display unit 32 once the call trace is activated. At line 54 it is indicated how many incoming calls have been linked to the traced number. The user clicks on line 56 to display the actual message generated by a central office. This process is repeated every time the traced number is called and a file containing the trace information is augmented with the additional messages regarding calls made to the traced number. It was found through testing that it took approximately 1 minute to complete the page from the time the traced phone began to ring. This time will vary and depends mostly on the paging company used. It was found that it takes about 5 minutes to successfully implement a trace, i.e., program the central offices. If the particularities of some of the central offices were eliminated, such as the need for entering a number twice for 1AESS switches the time to implement a trace could possibly be shortened to about 1.5 minutes.

In a preferred embodiment all the calls to the traced number are also logged with time stamps as well as sent downstream to a MACS system and may be obtained through normal tracing channels.

To cancel a call trace the user simply enters the number on which the trace was placed in line 42 of screen 40 with a "can" prefix attached to the traced number. A confirmation page similar to that shown in FIG. 6 is again returned from the central offices and displayed indicating whether the trace was successfully canceled or not.

Figure 8:
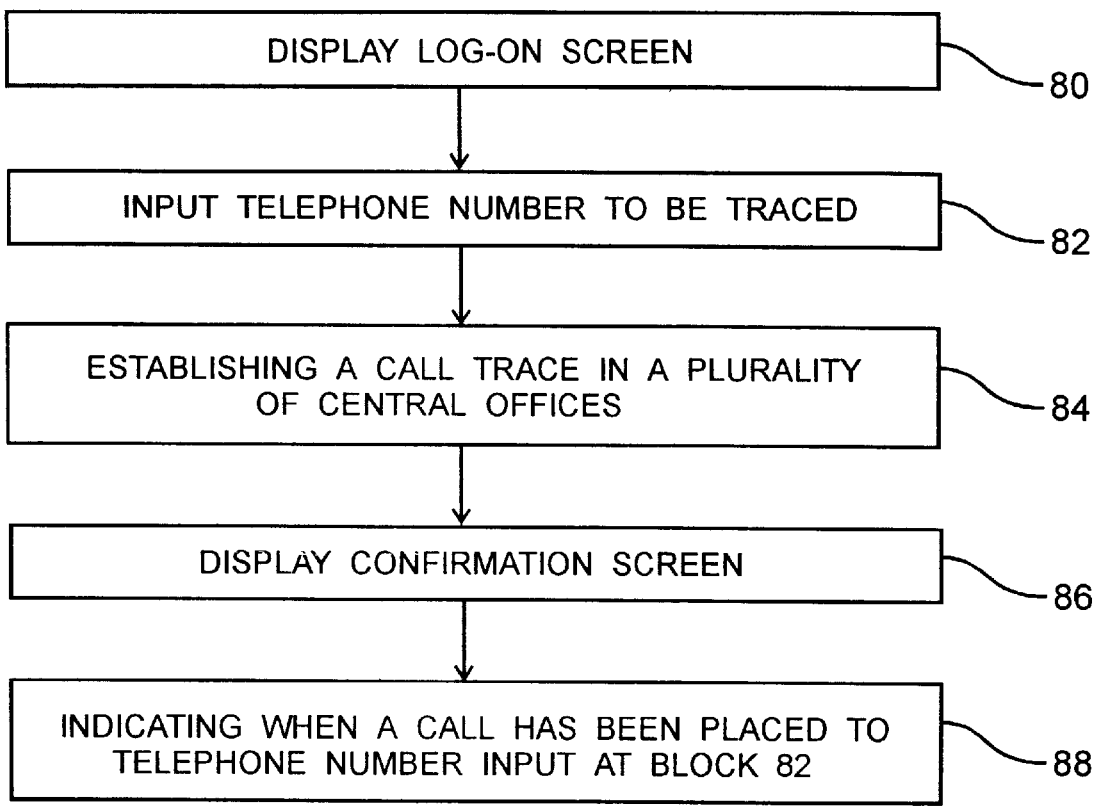
FIGS. 8 and 9 are flow charts of the call trace program according to preferred embodiments of the present invention.
Figure 9:
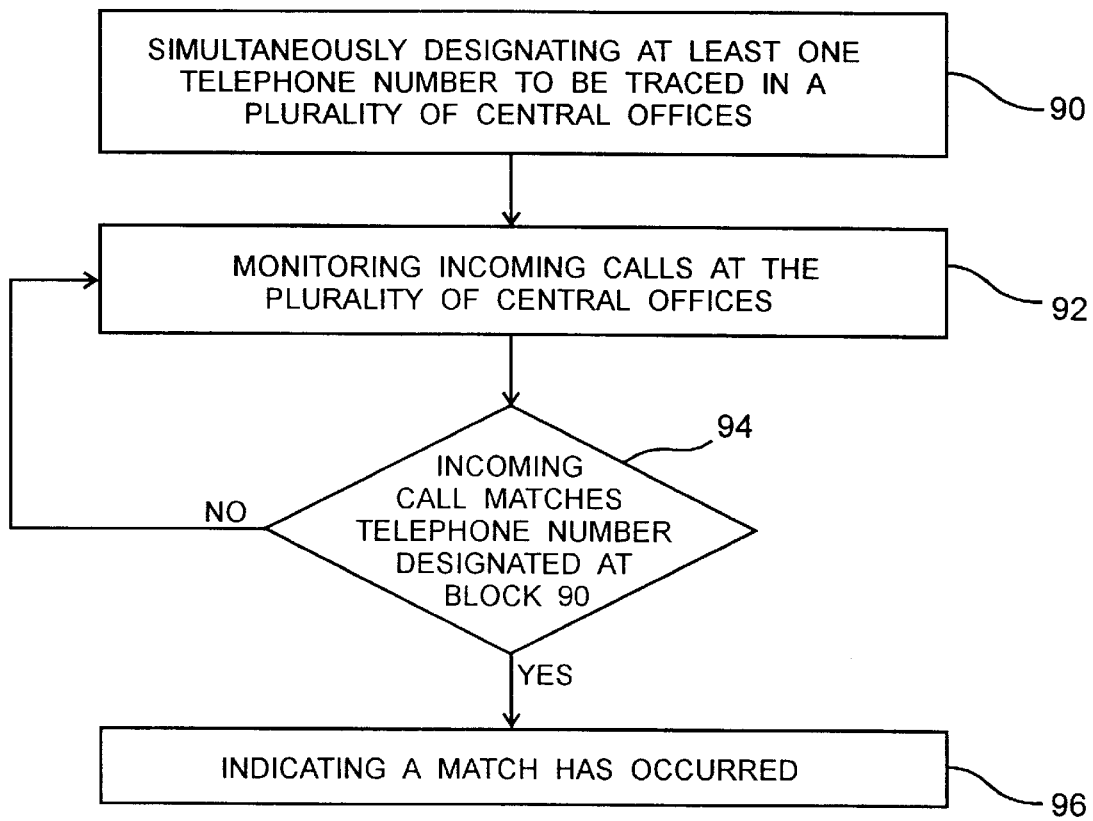

FIGS. 8 and 9 are flow charts of the call trace program according to preferred embodiments of the present invention.

It is to be understood that the forms of the invention described herein are to be taken as preferred examples and that various changes in the shape, size and arrangement of parts may be resorted to without departing from the spirit of the invention or scope of the claims.

Patent
Our Case No. 8285/168

IN THE UNITED STATES PATENT AND TRADEMARK OFFICE
APPLICATION FOR UNITED STATES LETTERS PATENT

SOURCE CODE APPENDIX FOR

INVENTORS: Paul W. Fellner
James F. Langdon

TITLE: A METHOD AND SYSTEM FOR
CALL TRACING

ATTORNEYS: Natalie D. Kadievitch
BRINKS HOFER GILSON & LIONE
P.O. BOX 10395
CHICAGO, ILLINOIS 60610
(312) 321-4200

APPENDIX page A-1

```
**************
calltrace_start Starts proc...
**************
*exit-script
copy 2,x
while
    equal x,2
do
*post-log 555,'scr','in calltrace_start' open-file filename='#m1_d01>LINKS>UUCP_DIR>Public_dir>autoftp>callnumber1',
    portname=portname,
    access-mode=1,
    io-type=4
read-record portname,cm if
    not-equal @status,0
then
    close-file portname
    goto skip
else
close-file portname delete-file '#m1_d01>LINKS>UUCP_DIR>Public_dir>autoftp>callnumber' open-file filename='#m1_d01>LINKS>UUCP_DIR>Public_dir>autoftp>callnumber',
    portname=portname1,
    access-mode=1,
    io-type=4
delete-record portname1
write-record portname1,cm
close-file portname1 delete-file '#m1_d01>LINKS>UUCP_DIR>Public_dir>autoftp>callnumber1' post-log 444,'scr','generating message'
    generate-internal-msg ne_msg_type='calltrace', msg='xxxxx'
end-if
skip:
sleep 10
end-while end-script
```

*[handwritten annotation: "Son as The debited call trace kicks off"]*

A-2

```
**************
trc_check (checks to make su   trace program is running)
**************
    open-file filename='#m1_d01>SysAdmin>langdonj>sched>call_trace_tmp',
    portname=portname,
    access-mode=1,
    io-type=4
    read-record portname,rec
    close-file portname
delete-file '#m1_d01>SysAdmin>langdonj>sched>call_trace_tmp'
if
    equal rec,'callnumber1'
then
exit-script
end-if date datetime,hour=hod,min=mor,sec=som,year=year,month=month,dayof_month=dom
concatenate stuff,'Restarting  Calltrace Program',
month,'-',dom,'-',year,' ',hod,':',mor,':',som open-file filename='#m1_d01>SysAdmin>langdonj>sched>call_trace_restart',
    portname=portname1,
    access-mode=1,
    io-type=3
    write-record portname1,stuff
    close-file portname1
perform-script 'calltrace_start'
end-script
```

(handwritten annotation: "restarts program")

```
**********
calltrace (is started from calltrace_start)
*********
get-sm-clli    target-id = neis_target_id,
               sm-id = rem_id,
               result = clli
gma-flatten  into=gma_std_data
perform-script 'amm_build', result=buildpkt
if
          equal buildpkt.error, 0
then
          send-to-application  buildpkt.buf, 0
end-if
end-script
```

```
*****************
trace_fnd
***************** get-sm-clli     target-id = neis_target_id,
                sm-id = rem_id,
                result = clli
gma-flatten   into=gma_std_data
perform-script 'amm_build', result=buildpkt
if
          equal buildpkt.error, 0
then
          send-to-application  buildpkt.buf, 0
end-if
end-script
```

A-5

```
*****************
sfax
*************** copy 'calltrace',dest

*concatenate text,neis_target_id,neis_raw_msg delete-file '#m3_d02>nma>execute>send_page.cm'
delete-file '#m2_d02>nma>execute>send_page.cm'
delete-file '#m1_d02>nma>execute>send_page.cm' concatenate cm,'#m1_d01>sfax>sfax_send \x27\x27 ',dest,
' -method alpha_pager -sender nma -text1 \x27',text,'\x27' open-file filename='#m3_d02>nma>execute>send_page.cm',
    portname=portn,
    access-mode=1,
    io-type=4
    write-record portn,cm
    close-file portn open-file filename='#m2_d02>nma>execute>send_page.cm',
    portname=portn,
    access-mode=1,
    io-type=4
    write-record portn,cm
    close-file portn open-file filename='#m1_d02>nma>execute>send_page.cm',
    portname=portn,
    access-mode=1,
    io-type=4
    write-record portn,cm
    close-file portn
generate-internal-msg ne_msg_type='trace_fnd', msg='page' end-script
```

```
**********************
calltrace_check
**********************
,

*exit-script
open-file filename='#m1_d01>LINKS>UUCP_DIR>Public_dir>autoftp>callnumber',
   portname=portname,
   access-mode=1,
   io-type=4
read-record portname,phnumber
close-file portname scan phnumber,'can',cn
if
     not-equal cn,0
then
exit-script
end-if substring phnumber,4,7,num scan term_dn,num,num1
if
     not-equal num1,0
then
concatenate text,'TRACE FOUND ',orig_dn,' CALLED ',phnumber,' FROM OFFICE ',
neis_target_id

*********** WRITE TO FILE IN ALL STATES************************
   string-util utility='rtrim',result=clly,arg-string=neis_target_id open-file filename='#m1_d01>LINKS>UUCP_DIR>Public_dir>rules>trace_page',
   portname=portname,
   access-mode=1,
   io-type=4
   write-record portname,text
   close-file portname exit-script
perform-script 'sfax'
end-if

* end-script
```

```
************************
calltrace:command.map
************************ post-log 9999,'scr','****',neis_target_id,'********'
*exit-script
perform-script 'dms100_calltrace'
end-script
``` nma all calltrace DNS 100 all
5ess
1aess
ewsd

5ess
1aess
ewsd

A-8

```
*****************
calltrace.sh
*****************

!/bin/sh while true
do
if [ -f /usr/local/etc/httpd/html/fast/rawtktrpts/data/callnumber ]
   then state=`cat /usr/local/etc/httpd/html/fast/rawtktrpts/data/stcalltrc`
callnumber=`cat /usr/local/etc/httpd/html/fast/rawtktrpts/data/callnumber` ftp <<!
open $state
cd autoftp
put /usr/local/etc/httpd/html/fast/rawtktrpts/data/callnumber callnumber1
delete callnumber
!

rm /usr/local/etc/httpd/html/fast/rawtktrpts/data/callnumber
rm /usr/local/etc/httpd/html/fast/rawtktrpts/data/stcalltrc sleep 240
ftp <<!
open $state
cd autoftp
get trace_info /usr/local/etc/httpd/html/fast/rawtktrpts/data/trace_info
delete trace_info
!
fi
sleep 5
done
```

A-9

```
*********************
calltrace.pl
*********************

!/opt/gnu/bin/perl if ($ENV{'REQUEST_METHOD'} eq 'POST') {

Get the input
        read(STDIN, $buffer, $ENV{'CONTENT_LENGTH'});
        # Split the name-value pairs
        @pairs = split(/&/, $buffer);
        #Loads the FROM variables foreach $pair (@pairs) {
           ($name, $value) = split(/=/, $pair);
           $value =~ tr/+/ /;
           $value =~ s/%0D%0A/<BR>/g;
           $value =~ s/%([a-fA-F0-9][a-fA-F0-9])/pack("C", hex($1))/eg;

$FORM{$name} = $value;
        }
}

$phnumber=$FORM{phnumber};
$state=$FORM{rtw_state};
$ph_length=length($phnumber);

if ($state eq "il" ) {
   $STATE = "nma2c.il";
   $stat= "Illinois";
   } else {
if ($state eq "in" ) {
   $STATE = "nma2.in";
   $stat= "Indiana";
   } else {
if ($state eq "mi" ) {
   $STATE = "nma2.mi";
   $stat= "Michigan";
   } else {
if ($state eq "oh" ) {
   $STATE = "nma2\.oh";
   $stat= "Ohio";
   } else {
if ($state eq "wi" ) {
   $STATE = "nma2.wi";
   $stat= "Wisconsin";
   }}}}}

$login=$FORM{login};
$pswd=$FORM{password};
%passwords=(
        "j803373", "gunther1",
        "j803371", "sueme2",
        );
$pswdtable=$passwords{$login};

if ($pswdtable eq ""){
&html("Login", "Login was Incorrect");exit;} if ($pswd ne $pswdtable) {
```

```perl
&html("Login", "Password was incorrect");exit;} if ($state eq "") {
&html_error("NO STATE WAS SELECTED PLEASE GO BACK AND SELECT A STATE");exit;} if ($phnumber eq "") {
&html_error("NO PHONE NUMBER WAS ENTERED PLEASE GO BACK AND ENTER A PHONE NUMBER");exit;} if ($ph_length != 10){
&html_error("WRONG NUMBER OF DIGITS IN PHONE NUMBER<BR>IT MUST BE 10 DIGITS");exit;} if ($pswd eq $pswdtable) {
&html_confirm;exit} sub html {

$document_title= $_[0];
$document_subject= $_[1];

print "Content-type: text/html\n\n";
        print "<HTML>\n";
        print "<HEAD>\n";
        print "<TITLE>$document_title</TITLE>\n";
        print "</HEAD>\n";
        print "<BODY BGCOLOR=fffedc>\n";
        print "<H1><FONT COLOR=cc0000><CENTER><BLINK>$document_subject</BLINK></FONT></CEN
        print "</H1><BR>\n";
        print "<EM><P>\n";
        print "Jim Langdon<BR>\n";
        print "j803373\@ameritech.com<BR>\n";
        print "414-678-5873<BR>\n";
        print "</P></EM>\n";
        print "</BODY>\n";
        print "</HTML>\n";
}
sub html_confirm {
        print "Content-type: text/html\n\n";
        print "<HTML>\n";
        print "<HEAD>\n";
        print "<TITLE>Calltrace Confirmation</TITLE>\n";
        print "</HEAD>\n";
        print "<BODY BGCOLOR=fffedc>\n";
        print "<FORM METHOD=POST ACTION=\x22/cgi-bin/calltract.pl\x22>\n";
        print "<INPUT TYPE=\x22checkbox\x22 NAME=\x22phnumber\x22 VALUE=\x22$phnumber\x22
        print "<INPUT TYPE=\x22checkbox\x22 NAME=\x22state\x22 VALUE=\x22$STATE\x22 CHECKE
        print "<H1><CENTER><BLINK>Calltrace Confirmation</BLINK></CENTER><BR>\n";
        print "<IMG SRC=/images/eyeline.gif><P>\n";
        print "Number to be Traced= <FONT COLOR=cc1111>$phnumber</FONT><P>\n";
        print "State Trace will be placed= <FONT COLOR=cc1111>$stat</FONT><BR>\n";
        print "<BR>\n";
        print "<CENTER><INPUT TYPE=\x22SUBMIT\x22 VALUE=\x22Correct\x22></CENTER><BR></H1>
        print "<EM><P>\n";
        print "Jim Langdon<BR>\n";
        print "j803373\@ameritech.com<BR>\n";
        print "414-678-5873<BR>\n";
        print "</P></EM>\n";
        print "</BODY>\n";
        print "</HTML>\n";
} sub html_error {
$text= $_[0];
        print "Content-type: text/html\n\n";
        print "<HTML>\n";
        print "<HEAD>\n";
```

A-11

```
    print "<TITLE>$text    TLE>\n";
    print "</HEAD>\n";
    print "<BODY BGCOLOR=fffedc>\n";
    print "<IMG SRC=/images/eyeline.gif><P>\n";
    print "<H1><CENTER><BLINK>$text</BLINK></CENTER></H1><BR>\n";
    print "<EM><P>\n";
    print "Jim Langdon<BR>\n";
    print "j803373@ameritech.com<BR>\n";
    print "414-678-5873<BR>\n";
    print "</P></EM>\n";
    print "</BODY>\n";
    print "</HTML>\n";
}
```

```
*************************
calltrace:udac
************************* post-log 444,'scr','in calltrace UDAC'

*exit-script
copy 1,send-parms.n_version
copy 'nma',send-parms.n_appl_id
copy 'all',send-parms.n_appl_rel
copy 'calltrace',send-parms.n_appl_msg_type
copy 2,send-parms.n_switches
copy 'dispindic;\x0d',data-buf
copy 'udac_action_q',send-parms.n_resp_qname
copy 6,send-parms.n_resp_qtype
copy 'cewsd     ',chan-id

*goto dms
*goto c5e
*goto cla concatenate ofcfile,'#m1_d01>LINKS>UUCP_DIR>Public_dir>ewsd>send>ab.offices' open-file filename=ofcfile,
portname=portname1,
access-mode=1,
io-type=1 copy 0,flag
while
    equal flag,0
    and
    less cntt,200
do
    read-record portname1,target-id
    if
        not-equal @status,0
    then
        copy 1,flag
        goto end.
    end-if n-send data-buf=data-buf,send-parms=send-parms,target-id=target-id,
    chan-id=chan-id

*post-log 222,'scr','@status=',@status add 1,cntt
end-while
end:
close-file portname1 sleep 10

****1A*1A*1A1A************ cla:
copy 'cla      ',chan-id concatenate ofcfile,'#m1_d01>LINKS>UUCP_DIR>Public_dir>la>send>ab.offices' open-file filename=ofcfile,
portname=portname1,
```

A-13

```
access-mode=1,
io-type=1 copy 0,flag
while
      equal flag,0
      and
      less cntt,200
do
      read-record portname1,target-id
      if
            not-equal @status,0
      then
            copy 1,flag
            goto end1a
      end-if

*post-log 333,'scr','target-id=',target-id n-send data-buf=data-buf,send-parms=send-parms,target-id=target-id,
      chan-id=chan-id

*post-log 222,'scr','@status=',@status,'For Clli=',target-id add 1,cntt
end-while
end1a:
close-file portname1 sleep 10

***********5E*5E*5E*5E*5E*********** c5e:
copy 'c5e        ',chan-id concatenate ofcfile,'#m1_d01>LINKS>UUCP_DIR>Public_dir>5e>send>ab.offices' open-file filename=ofcfile,
portname=portname1,
access-mode=1,
io-type=1 copy 0,flag
while
      equal flag,0
      and
      less cntt,200
do
      read-record portname1,target-id
      if
            not-equal @status,0
      then
            copy 1,flag
            goto end5e
      end-if

*post-log 333,'scr','target-id=',target-id n-send data-buf=data-buf,send-parms=send-parms,target-id=target-id,
      chan-id=chan-id

*post-log 222,'scr','@status=',@status,'For Clli=',target-id add 1,cntt
end-while
```

A-14

```
end5e:
close-file portname1 sleep 10

*******DMS***DMS**DMS**DMS******* dms:
copy 'c100      ',chan-id concatenate ofcfile,'#ml_d01>LINKS>UUCP_DIR>Public_dir>dms100>send>ab.offices',
'.c100' open-file filename=ofcfile,
portname=portname1,
access-mode=1,
io-type=1 copy 0,flag
while
     equal flag,0
     and
     less cntt,200
do
     read-record portname1,target-id
     if
          not-equal @status,0
     then
          copy 1,flag
          goto enddms
     end-if

*post-log 333,'scr','target-id=',target-id n-send data-buf=data-buf,send-parms=send-parms,target-id=target-id,
     chan-id=chan-id

*post-log 222,'scr','@status=',@status,'For Clli=',target-id add 1,cntt
end-while
enddms:
close-file portname1 dms1:
copy 'm100a     ',chan-id concatenate ofcfile,'#ml_d01>LINKS>UUCP_DIR>Public_dir>dms100>send>ab.offices',
'.m100a' open-file filename=ofcfile,
portname=portname1,
access-mode=1,
io-type=1 copy 0,flag
while
     equal flag,0
     and
     less cntt,200
do
     read-record portname1,target-id
     if
          not-equal @status,0
     then
          copy 1,flag
```

A-15

```
        goto enddms1
    end-if

*post-log 333,'scr','target-id=',target-id n-send data-buf=data-buf,send-parms=send-parms,target-id=target-id,
    chan-id=chan-id

*post-log 222,'scr','@status=',@status,'For Clli=',target-id add 1,cntt
end-while
enddms1:
close-file portname1 end-script
```

*Web Server Programs*

```perl
#!/opt/gnu/bin/perl
if ($ENV{'REQUEST_METHOD'} eq 'POST') {

Get the input
        read(STDIN, $buffer, $ENV{'CONTENT_LENGTH'});
        # Split the name-value pairs
        @pairs = split(/&/, $buffer);
        #Loads the FROM variables foreach $pair (@pairs) {
           ($name, $value) = split(/=/, $pair);
           $value =~ tr/+/ /;
           $value =~ s/%0D%0A/<BR>/g;
           $value =~ s/%([a-fA-F0-9][a-fA-F0-9])/pack("C", hex($1))/eg;

$FORM{$name} = $value;
        }
}

$phnumber=$FORM{phnumber};
$state=$FORM{state};

if ($state eq "nma2c.il" ) {
   $STATE = "Illinois";
   } else {
if ($state eq "nma2.in" ) {
   $STATE = "Indiana";
   } else {
if ($state eq "nma2.mi" ) {
   $STATE = "Michigan";
   } else {
if ($state eq "nma2.oh" ) {
   $STATE = "Ohio";
   } else {
if ($state eq "nma2.wi" ) {
   $STATE = "Wisconsin";
}}}}}

$tmpcallfile="/usr/local/etc/httpd/html/fast/rawtktrpts/data/callnumber";
$tmpstcall="/usr/local/etc/httpd/html/fast/rawtktrpts/data/stcalltr";

if (open (NUM, ">$tmpcallfile")) {
print NUM "$phnumber";} if (open (STATE, ">$tmpstcall")) {
print STATE "$state";} close (NUM);
close (STATE);        *Sleep func needs to be increased to about 5 mins*
sleep 10;
$call_trace_info="/usr/local/etc/httpd/html/fast/rawtktrpts/data/trace_info";
open (CALLINFO, "$call_trace_info");        *Retrieved Info* while (<CALLINFO>){ push(@cli,$_);} close (CALLINFO);

print "Content-type: text/html\n\n";
        print "<HTML>\n";
        print "<HEAD>\n";
```

A-17

```
print "<TITLE>Call    e Entered</TITLE\n";
print "</HEAD>\n";
print "<BODY BGCOLOR=fffedc>\n";
print "<H1><CENTER>BAD DATA</CENTER></H1>";
print "<IMG SRC=/images/eyeline.gif><P>\n";
print "<H3><FONT COLOR=cc1111>@cli</FONT></H3><P>\n";
print "</H1><EM><P>\n";
print "Jim Langdon<BR>\n";
print "j803373\@ameritech.com<BR>\n";
print "414-678-5873<BR>\n";
print "</P></EM>\n";
print "</BODY>\n";
print "</HTML>\n";
```

```
<HTML>
<HEAD><TITLE>Call Trace</TIT_E></HEAD><P>
<BODY BACKGROUND="images/bg75.gif">
<H1><CENTER>CALL TRACE GUI<H1>
<FORM METHOD=POST ACTION="/cgi-bin/calltrace.pl">
<IMG SRC="images/colorbar.gif"><BR>
<H2>Enter The Telephone number
<INPUT TYPE="text" NAME="phnumber" SIZE=10 MAXLENGTH=10><P>
Select The State:<BR>
<INPUT TYPE="radio" NAME="rtw_state" VALUE="il">Illinois
<INPUT TYPE="radio" NAME="rtw_state" VALUE="in">Indiana
<INPUT TYPE="radio" NAME="rtw_state" VALUE="mi">Michigan
<INPUT TYPE="radio" NAME="rtw_state" VALUE="oh">Ohio
<INPUT TYPE="radio" NAME="rtw_state" VALUE="wi">Wisconsin<P>
<H2><CENTER>Enter Your Login:<INPUT TYPE="text" NAME="login" SIZE=10 MAXLENGTH=10><BR></CEN
<H2><CENTER>Enter Your Password:<INPUT TYPE="password" NAME="password" SIZE=10 MAXLENGTH=1(
<INPUT TYPE="SUBMIT" VALUE="submit"> <INPUT TYPE="RESET" VALUE="reset"><P>
</FORM>
<img src="/cgi-bin/Count.cgi?ft=9|frgb=102;205;50|df=caaltrace" align=absmiddle border=0>
<BR>
<EM><P>
Jim Langdon<BR>
jim.langdon@ameritech.com<BR>
414-678-5873<BR>
</P></EM>
</BODY>
</HTML>
```

```perl
#!/opt/gnu/bin/perl
if ($ENV{'REQUEST_METHOD'} eq 'POST') {

Get the input
        read(STDIN, $buffer, $ENV{'CONTENT_LENGTH'});
        # Split the name-value pairs
        @pairs = split(/&/, $buffer);
        #Loads the FROM variables foreach $pair (@pairs) {
           ($name, $value) = split(/=/, $pair);
           $value =~ tr/+/ /;
           $value =~ s/%0D%0A/<BR>/g;
           $value =~ s/%([a-fA-F0-9][a-fA-F0-9])/pack("C", hex($1))/eg;

$FORM{$name} = $value;
         }
}

$phnumber=$FORM{phnumber};
$state=$FORM{rtw_state};
$ph_length=length($phnumber);

if ($state eq "il" ) {
   $STATE = "nma2c.il";
   $stat= "Illinois";
   } else {
if ($state eq "in" ) {
   $STATE = "nma2.in";
   $stat= "Indiana";
   } else {
if ($state eq "mi" ) {
   $STATE = "nma2.mi";
   $stat= "Michigan";
   } else {
if ($state eq "oh" ) {
   $STATE = "nma2.oh";
   $stat= "Ohio";
   } else {
if ($state eq "wi" ) {
   $STATE = "nma2.wi";
   $stat= "Wisconsin";
}}}}}

$login=$FORM{login};
$pswd=$FORM{password};
%passwords=(
         "j803373", "gunther1",
         "j803371", "sueme2",
         );
$pswdtable=$passwords{$login};

if ($pswdtable eq ""){
&html("Login", "Login was Incorrect");exit;} if ($pswd ne $pswdtable) {
&html("Login", "Password was Incorrect");exit;} if ($state eq "") {
&html_error("NO STATE WAS SELECTED PLEASE GO BACK AND SELECT A STATE");exit;} if ($phnumber eq "") {
&html_error("NO PHONE NUMBER WAS ENTERED PLEASE GO BACK AND ENTER A PHONE NUMBER");exit;} if ($ph_length != 10){
```

A-20

```perl
&html_error("WRONG NUMBER C   IGITS IN PHONE NUMBER<BR>IT MUS   : 10 DIGITS");exit;} if ($pswd eq $pswdtable) {
&html_confirm;exit} sub html {

$document_title= $_[0];
$document_subject= $_[1];

print "Content-type: text/html\n\n";
        print "<HTML>\n";
        print "<HEAD>\n";
        print "<TITLE>$document_title</TITLE>\n";
        print "</HEAD>\n";
        print "<BODY BGCOLOR=fffedc>\n";
        print "<H1><FONT COLOR=cc0000><CENTER><BLINK>$document_subject</BLINK></FONT></CEN:
        print "</H1><BR>\n";
        print "<EM><P>\n";
        print "Jim Langdon<BR>\n";
        print "j803373\@ameritech.com<BR>\n";
        print "414-678-5873<BR>\n";
        print "</P></EM>\n";
        print "</BODY>\n";
        print "</HTML>\n";

sub html_confirm {
        print "Content-type: text/html\n\n";
        print "<HTML>\n";
        print "<HEAD>\n";
        print "<TITLE>Calltrace Confirmation</TITLE>\n";
        print "</HEAD>\n";
        print "<BODY BGCOLOR=fffedc>\n";
        print "<FORM METHOD=POST ACTION=\x22/cgi-bin/calltract.pl\x22>\n";
        print "<INPUT TYPE=\x22checkbox\x22 NAME=\x22phnumber\x22 VALUE=\x22$phnumber\x22 C
        print "<INPUT TYPE=\x22checkbox\x22 NAME=\x22state\x22 VALUE=\x22$STATE\x22 CHECKED
        print "<H1><CENTER><BLINK>Calltrace Confirmation</BLINK></CENTER><BR>\n";
        print "<IMG SRC=/images/eyeline.gif><P>\n";
        print "Number to be Traced= <FONT COLOR=cc1111>$phnumber</FONT><P>\n";
        print "State Trace will be placed= <FONT COLOR=cc1111>$stat</FONT><BR>\n";
        print "<BR>\n";
        print "<CENTER><INPUT TYPE=\x22SUBMIT\x22 VALUE=\x22Correct\x22></CENTER><BR></H1>\
        print "<EM><P>\n";
        print "Jim Langdon<BR>\n";
        print "j803373\@ameritech.com<BR>\n";
        print "414-678-5873<BR>\n";
        print "</P></EM>\n";
        print "</BODY>\n";
        print "</HTML>\n";
} sub html_error {
$text= $_[0];
        print "Content-type: text/html\n\n";
        print "<HTML>\n";
        print "<HEAD>\n";
        print "<TITLE>$text</TITLE>\n";
        print "</HEAD>\n";
        print "<BODY BGCOLOR=fffedc>\n";
        print "<IMG SRC=/images/eyeline.gif><P>\n";
        print "<H1><CENTER><BLINK>$text</BLINK></CENTER></H1><BR>\n";
        print "<EM><P>\n";
        print "Jim Langdon<BR>\n";
        print "j803373\@ameritech.com<BR>\n";
        print "414-678-5873<BR>\n";
```

A-21

```
    print "</P></EM>\n
    print "</BODY>\n";
    print "</HTML>\n";
}
```

```
******************                2822  Trc-ipct      ⊥3    line 115
s02822                                         Cт✓5   Trk 163
****************** perform-script 'amm_parse', result=parse_rc
    if
         not-equal  parse_rc, 0
    then
         exit-script
    end-if

*   get-sm-clli    target-id = neis_target_id,
*                  sm-id = rem_id,
*                  result = clli

* Create call trace variables -- trap_ofc -- ofc_typ for expansion substring neis_target_id,1,11,trap_ofc copy 'EWSD    ',ofc_typ clear d1
    clear d2 copy '            ',term_num
    copy '            ',orig_dn
    copy '    ',term_len_fid
    copy '       ',term_len
    copy '       ',alt_tn
    copy ' ',typ_ind
    copy '  ',term_pbx_mem
    copy '      ',term_ofc
    copy '  ',orig_len_fid
    copy '       ',orig_len
    copy '    ',tgn
    copy '       ',trk_mem
    copy '      ',trk_grp
    copy '   ',orig_mlhg_grp
    copy '    ',orig_mlhg_mem_num
    copy ' ',trace_ind
    copy '        ',cot_time
    copy ' ',multi_line_ind
    copy ' ',call_trace_wait
    copy '      ',term_party
    copy '  ',term_to
    copy '       ',orig_party
    copy '   ',orig_from perform-script 'parse_line',result=field_array,param=info substring  info,5,1,lt
    if
         greater-or-equal lt, 0
    then
         goto line_trc
    end-if
```

A-23

```
        copy field_array[1],tg..

copy field_array[2],trk_mem copy field_array[3],term_num
        substring term_num,1,3,cld_ofc

*****************
*Pad out tgn and trk_mem number to 13 characters and 7 characters
*****************

* Remove leading blanks from trk_mem so it can be left justified in field.

string-util utility='ltrim',result=trk_mem,arg-string=trk_mem
    string-util utility='rtrim',result=trk_mem,arg-string=trk_mem concatenate tgn_tmp,tgn,'         '
       substring tgn_tmp,1,4,tgn
       concatenate trk_mem_tmp,trk_mem,'        '
       substring trk_mem_tmp,1,7,trk_mem goto tr_out line_trc:

copy field_array[1],orig_dn
    copy field_array[2],term_num
    substring term_num,1,3,cld_ofc tr_out:

string-util utility='rtrim',result=tmp_term_num,arg-string=term_num
string-util utility='length',result=dn_length,arg-string=tmp_term_num

* if dialed dn is less than 7 digits then exit script since we don't want
* it
 if
  less dn_length,7
 then
  exit-script
 end-if

* Determine terminating number area code
           clear tnpa
  perform-script 'vlata_conv',lata,tnpa,param=trap_ofc,param=cld_ofc
       copy lata,tnpa

*   Set flag to tell db admin if no npa data for this office in lata_conv if
      is-null tnpa
    then
      copy 'Missing Lata/NPA',script_result
      copy '000',tnpa
      copy 'lata',trc_trbl
    end-if
```

A-24

```
    if
        less dn_length,10
    then
        concatenate termdn,tnpa,term_num
    else
        copy term_num,termdn
    end-if

*****************************************************************************
*
* Added 8-3-96 Jeff Bjerke, term_dn with 10-digits were not getting
* converted lata from lookup tables.
***************************************************************************** if
        not-equal '000',tnpa
        equal lata, '630'
        equal dn_length, 10
    then
        substring term_num,4,7,term_dn_temp_10
        concatenate termdn, lata, term_dn_temp_10
    end-if string-util utility='length',result=odn_length,arg-string=orig_dn
  if
     less odn_length,10
  then
   substring orig_dn,1,3,cld_ofc
   copy tnpa,tnpa_hold
perform-script 'vlata_conv',lata,param=trap_ofc,param=cld_ofc if
     not-equal lata,tnpa_hold
  then
     copy lata,onpa
     copy tnpa_hold,tnpa
  else
     copy tnpa,onpa
  end-if concatenate orig_dn,onpa,orig_dn
  end-if copy termdn,term_dn
perform-script 'cnvrt_312_773' concatenate neis_raw_msg,
        term_dn,
        month,day,year,
        hour,minutes,seconds,
        trap_ofc,alt_tn,
        typ_ind,term_len_fid,term_len,
        term_pbx_mem,term_ofc,orig_dn,orig_len_fid,orig_len,
        tgn,trk_mem,trk_grp,orig_mlhg_grp,orig_mlhg_mem_num,ofc_typ,
        trace_ind,cot_time,multi_line_ind,call_trace_wait,
        term_party,term_to,orig_party,orig_from,neis_eol
perform-script 'calltrace_check'
```

A·25

```
string-util utility='length',result=msg_length,arg-string=ne__raw_msg
    if
      not-equal msg_length,'158'
        and
      not-equal msg_length,'162'
    then
    concatenate data_out,'EWSD s02822 invalid call trace message length= ',
            msg_length
    post-log appl='nma',data=data_out
    copy 'yes',trc_trbl
    concatenate script_result,'Length of invalid s02822 ct msg is ',
            msg_length
    end-if

*post-log '1','scc',neis_raw_msg
    gma-flatten  into=gma_std_data
    perform-script 'amm_build', result=buildpkt
    if
        equal buildpkt.error, 0
    then
        send-to-application  buildpkt.buf, 0
    end-if
    end-script
```

```
***********************
calltract.pl
***********************

!/opt/gnu/bin/perl if ($ENV{'REQUEST_METHOD'} eq 'POST') {

Get the input
        read(STDIN, $buffer, $ENV{'CONTENT_LENGTH'});
        # Split the name-value pairs
        @pairs = split(/&/, $buffer);
        #Loads the FROM variables foreach $pair (@pairs) {
          ($name, $value) = split(/=/, $pair);
          $value =~ tr/+/ /;
          $value =~ s/%0D%0A/<BR>/g;
          $value =~ s/%([a-fA-F0-9][a-fA-F0-9])/pack("C", hex($1))/eg;

$FORM{$name} = $value;
        }
}

$phnumber=$FORM{phnumber};
$state=$FORM{state};

if ($state eq "nma2c.il" ) {
  $STATE = "Illinois";
  } else {
if ($state eq "nma2.in" ) {
  $STATE = "Indiana";
  } else {
if ($state eq "nma2.mi" ) {
  $STATE = "Michigan";
  } else {
if ($state eq "nma2.oh" ) {
  $STATE = "Ohio";
  } else {
if ($state eq "nma2.wi" ) {
  $STATE = "Wisconsin";
  }}}}}

$tmpcallfile="/usr/local/etc/httpd/html/fast/rawtktrpts/data/callnumber";
$tmpstcall="/usr/local/etc/httpd/html/fast/rawtktrpts/data/stcalltrc";

if (open (NUM, ">$tmpcallfile")) {
print NUM "$phnumber";} if (open (STATE, ">$tmpstcall")) {
print STATE "$state";} close (NUM);
close (STATE);

sleep 260;
$call_trace_info="/usr/local/etc/httpd/html/fast/rawtktrpts/data/trace_info";
open (CALLINFO, "$call_trace_info");

while (<CALLINFO>){ push(@cli,$_);}
```

A-27

```
close (CALLINFO);

unlink($call_trace_info);

print "Content-type: text/html\n\n";
        print "<HTML>\n";
        print "<HEAD>\n";
        print "<TITLE>Call Trace Entered</TITLE\n";
        print "</HEAD>\n";
        print "<BODY BGCOLOR=fffedc>\n";
        print "<H1><CENTER>CALLTRACE DATA</CENTER></H1>";
        print "<IMG SRC=/images/eyeline.gif><P>\n";
        print "<H3><FONT COLOR=cc1111>@cli</FONT></H3><P>\n";
        print "</H1><EM><P>\n";
        print "Jim Langdon<BR>\n";
        print "j803373\@ameritech.com<BR>\n";
        print "414-678-5873<BR>\n";
        print "</P></EM>\n";
        print "</BODY>\n";
        print "</HTML>\n";
```

A-28

```
***********************
dms100_calltrace
*********************** copy neis_channel_id,dms_chan open-file filename='#m1_d01>LINKS>UUCP_DIR>Public_dir>autoftp>callnumber',
    portname=portname,
    access-mode=1,
    io-type=4
read-record portname,phnumber
close-file portname

**************************CANCEL CALL TRACE *****************
scan phnumber,'can',cn
if
    not-equal cn,0
then
    string-replace 'can','',phnumber
end-if perform-script 'dms_login',result=login_status if
    equal login_status,2
then
*********** WRITE TO FILE IN ALL STATES**********************
string-util utility='rtrim',result=clly,arg-string=neis_target_id open-file filename='#m1_d01>LINKS>UUCP_DIR>Public_dir>autoftp>trace_info',
    portname=portname,
    access-mode=1,
    io-type=3
    concatenate stuff,clly,' Failed to Login into Switch: Failed to enter ',
    phnumber,' ',login_reason,'<BR>'
if
    not-equal cn,0
then
    concatenate stuff,clly,' Failed to Login into Switch: Failed to remove ',
    phnumber,'<BR>'
end-if
    write-record portname,stuff
    close-file portname
    exit-script
***************************************************************
end-if
********************CANCEL TRACE***************************
if
    not-equal cn,0
then
concatenate out_msg,'TABLE CLIDN;VER OFF;DEL ',phnumber,';QUIT ALL\x0d'
send-to-ne out_msg,20,dms_chan copy 999,parse_reg copy 'TUPLE DELETED',text
wait-for-response 'all_match_text',20,dms_chan if
    not-equal parse_reg,0
then
*********** WRITE TO FILE IN ALL STATES**********************
```

```
string-util utility='rtrim',result=clly,arg-string=neis_target_id open-file filename='#ml_d01>LINKS>UUCP_DIR>Public_dir>autoftp>trace_info',
    portname=portname,
    access-mode=1,
    io-type=3
concatenate stuff,clly,' Failed to remove ',phnumber,' from calltrace list<BR>'
    write-record portname,stuff
    close-file portname
exit-script
end-if
*********** WRITE TO FILE IN ALL STATES************************
string-util utility='rtrim',result=clly,arg-string=neis_target_id open-file filename='#ml_d01>LINKS>UUCP_DIR>Public_dir>autoftp>trace_info',
    portname=portname,
    access-mode=1,
    io-type=3
concatenate stuff,clly,' Good Removal of ',phnumber,' from trace list<BR>'
    write-record portname,stuff
    close-file portname exit-script
end-if

*********************ADD TRACE************************************
concatenate in_msg,'TABLE CLIDN;VER OFF;ADD ',phnumber,';QUIT ALL\x0d'
send-to-ne in_msg,20,dms_chan copy 999,parse_reg copy 'TUPLE ADDED',text
wait-for-response 'all_match_text',20,dms_chan if
     not-equal parse_reg,0
then
*********** WRITE TO FILE IN ALL STATES************************
string-util utility='rtrim',result=clly,arg-string=neis_target_id open-file filename='#ml_d01>LINKS>UUCP_DIR>Public_dir>autoftp>trace_info',
    portname=portname,
    access-mode=1,
    io-type=3
concatenate stuff,clly,' Failed to enter ',phnumber,' into calltrac list<BR>'
    write-record portname,stuff
    close-file portname
exit-script
end-if

*********** WRITE TO FILE IN ALL STATES************************
string-util utility='rtrim',result=clly,arg-string=neis_target_id open-file filename='#ml_d01>LINKS>UUCP_DIR>Public_dir>autoftp>trace_info',
    portname=portname,
    access-mode=1,
    io-type=3
concatenate stuff,clly,' Good Calltrace Entry ',phnumber,'<BR>'
    write-record portname,stuff
    close-file portname end-script                                                    A-30
```

```
***************************
la_calltrace
*************************** open-file filename='#m1_d01>LINKS>UUCP_DIR>Public_dir>autoftp>callnumber',
    portname=portname,
    access-mode=1,
    io-type=4
read-record portname,phnumber
close-file portname
concatenate phnumber1,'0',phnumber
concatenate phnumber2,'2',phnumber copy '03125516308',rphnumber1
copy '23125516308',rphnumber2

************************CANCEL CALL TRACE *****************
scan phnumber1,'can',cn
if
    not-equal cn,0
then
    string-replace 'can','',phnumber1
    string-replace 'can','',phnumber2 copy phnumber1,rphnumber1
    copy phnumber2,rphnumber2 copy '03125516308',phnumber1
    copy '23125516308',phnumber2
end-if concatenate out_msg1,'CI-REMOVE-',rphnumber1,'.\x04'
concatenate out_msg2,'CI-REMOVE-',rphnumber2,'.\x04'
concatenate in_msg1,'CI-ENTER-',phnumber1,'AT.\x04'
concatenate in_msg2,'CI-ENTER-',phnumber2,'AT.\x04' send-to-ne out_msg1,10,'cla'
copy 999,parse_reg
copy 'cmd_ack_OK',mssg
wait-for-response 'all_match',10,'cla'
if
    not-equal parse_reg,0
then
    send-to-ne out_msg1,10,'cla'
end-if send-to-ne out_msg2,20,'cla'
copy 999,parse_reg
copy 'cmd_ack_OK',mssg
wait-for-response 'all_match',20,'cla'
if
    not-equal parse_reg,0
then
    send-to-ne out_msg1,10,'cla'
end-if send-to-ne in_msg1,20,'cla'
sleep 3
send-to-ne in_msg1,20,'cla'
copy 999,parse_reg
copy 'cmd_ack_OK',mssg
wait-for-response 'all_match',20,'cla'
```

A-31

```
if
    not-equal parse_reg,0
then
*********** WRITE TO FILE IN ALL STATES*************************
string-util utility='rtrim',result=clly,arg-string=neis_target_id open-file filename='#m1_d01>LINKS>UUCP_DIR>Public_dir>autoftp>trace_info',
   portname=portname,
   access-mode=1,
   io-type=3
concatenate stuff,clly,' Failed to enter ',phnumber1,' into calltrac list<BR>'

********************For Cancel*************************
    if
       not-equal cn,0
    then
concatenate stuff,clly,' Failed to remove call trace for ',rphnumber1,
    ' and return ',phnumber1,' back on list<BR>'
    end-if
    ******************For Cancel*********************** write-record portname,stuff
    close-file portname
goto next
else

*********** WRITE TO FILE IN ALL STATES*************************
string-util utility='rtrim',result=clly,arg-string=neis_target_id open-file filename='#m1_d01>LINKS>UUCP_DIR>Public_dir>autoftp>trace_info',
   portname=portname,
   access-mode=1,
   io-type=3
concatenate stuff,clly,' Good Calltrace Entry ',phnumber1,'<BR>'
    ********************For Cancel*************************
    if
       not-equal cn,0
    then
concatenate stuff,clly,' Good Removal of ',rphnumber1,' and return of ',
phnumber1,'<BR>'
    end-if
    *********************************************************** write-record portname,stuff
   close-file portname
end-if next:
send-to-ne in_msg2,20,'cla'
sleep 3
send-to-ne in_msg2,20,'cla'
copy 999,parse_reg
copy 'cmd_ack_OK',mssg
wait-for-response 'all_match',120,'cla'
if
    not-equal parse_reg,0
then
*********** WRITE TO FILE IN ALL STATES*************************
string-util utility='rtrim',result=clly,arg-string=neis_target_id open-file filename='#m1_d01>LINKS>UUCP_DIR>Public_dir>autoftp>trace_info',
   portname=portname,
   access-mode=1,
   io-type=3
concatenate stuff,clly,' Failed to enter ',phnumber2,' into calltrac list<BR>'
```

A-32

```
*******************For Cancel*************************
   if
      not-equal cn,0
   then
concatenate stuff,clly,' Failed to remove call trace for ',rphnumber2,
   ' and return ',phnumber2,' back on list<BR>'
   end-if
*****************For Cancel*********************** write-record portname,stuff
   close-file portname
exit-script
else

*********** WRITE TO FILE IN ALL STATES**********************
string-util utility='rtrim',result=clly,arg-string=neis_target_id open-file filename='#ml_d01>LINKS>UUCP_DIR>Public_dir>autoftp>trace_info',
   portname=portname,
   access-mode=1,
   io-type=3
concatenate stuff,clly,' Good Calltrace Entry ',phnumber2,'<BR>'
*******************For Cancel*************************
   if
      not-equal cn,0
   then
concatenate stuff,clly,' Good Removal of ',rphnumber2,' and return of ',
phnumber2,'<BR>'
   end-if
*********************************************************** write-record portname,stuff
   close-file portname
end-if

*post-log 444,'scr','phnumber1=',phnumber1
*post-log 444,'scr','phnumber2=',phnumber2
*post-log 555,'scr','rphnumber1=',rphnumber1
*post-log 555,'scr','rphnumber2=',rphnumber2 end-script
```

A-33

```
**********************
ewsd_calltrace
********************** open-file filename='#m1_d01>LINKS>UUCP_DIR>Public_dir>autoftp>callnumber',
   portname=portname,
   access-mode=1,
   io-type=4
read-record portname,phnumber
close-file portname copy '3125516308',rphnumber
***********************CANCEL CALL TRACE ***************
scan phnumber,'can',cn
if
     not-equal cn,0
then
     string-replace 'can','',phnumber
     copy phnumber,rphnumber
     copy '3125516308',phnumber
end-if concatenate out_msg,'cantracelst:dn=',rphnumber,';\x0d'
concatenate in_msg,'entrtracelst:dn=',phnumber,';\x0d'
send-to-ne out_msg,20,'cewsd'
copy 's00007',mssg
wait-for-response 'all_match',30,'cewsd' send-to-ne in_msg,20,'cewsd'
copy 999,parse_reg
copy 's00007',mssg
wait-for-response 'all_match',120,'cewsd'
if
     not-equal parse_reg,0
then
*********** WRITE TO FILE IN ALL STATES**********************
string-util utility='rtrim',result=clly,arg-string=neis_target_id open-file filename='#m1_d01>LINKS>UUCP_DIR>Public_dir>autoftp>trace_info',
     portname=portname,
     access-mode=1,
     io-type=3
concatenate stuff,clly,' Failed to enter ',phnumber,' into calltrac list<BR>'

*******************For Cancel*************************
     if
       not-equal cn,0
     then
concatenate stuff,clly,' Failed to remove call trace for ',rphnumber,
   ' and return ',phnumber,' back on list<BR>'
     end-if
     *****************For Cancel*********************** write-record portname,stuff
     close-file portname
exit-script
else
*********** WRITE TO FILE IN ALL STATES**********************
string-util utility='rtrim',result=clly,arg-string=neis_target_id open-file filename='#m1_d01>LINKS>UUCP_DIR>Public_dir>autoftp>trace_info',
```

A-34

```
   portname=portname,
   access-mode=1,
   io-type=3
concatenate stuff,clly,' Good Calltrace Entry ',phnumber,'<BR>'
*********************For Cancel**************************
   if
      not-equal cn,0
   then
concatenate stuff,clly,' Good Removal of ',rphnumber,' and return of ',
phnumber,'<BR>'
   end-if
   ************************************************************
   write-record portname,stuff
   close-file portname
end-if end-script
```

A-35

```
*********************
5e_calltrace
********************* open-file filename='#ml_d01>LINKS>UUCP_DIR>Public_dir>autoftp>callnumber',
   portname=portname,
   access-mode=1,
   io-type=4
read-record portname,phnumber
close-file portname copy '3125516308',rphnumber
copy '5516308',rphnumber1

**************************CANCEL CALL TRACE *****************
scan phnumber,'can',cn
if
     not-equal cn,0
then
     string-replace 'can','',phnumber
     copy phnumber,rphnumber
     copy '3125516308',phnumber
end-if

*************Check Lata to see it NPA will need to be entered******** string-util utility='rtrim',result=clly,arg-string=neis_target_id concatenate ne_parms_clly,'ne_parms_',clly
perform-script ne_parms_clly substring phnumber,1,3,lata_trace_number
if
     equal lata,lata_trace_number
then
     string-replace lata,'',phnumber
end-if

*****************Done with lata stuff ******************** concatenate out_msg,'trc:clid:del,dn=',rphnumber,';\x0d'
concatenate out_msg1,'trc:clid:del,dn=',rphnumber1,';\x0d' concatenate in_msg,'trc:clid:add,dn=',phnumber,';\x0d'
send-to-ne out_msg,20,'c5e'
copy 'OK',text
wait-for-response 'all_match_text',10,'c5e' send-to-ne out_msg1,20,'c5e'
copy 'OK',text
wait-for-response 'all_match_text',10,'c5e' send-to-ne in_msg,20,'c5e'
copy 999,parse_reg
copy 'OK',text
wait-for-response 'all_match_text',20,'c5e'
if
     not-equal parse_reg,0
then
*********** WRITE TO FILE IN ALL STATES***********************
string-util utility='rtrim',result=clly,arg-string=neis_target_id
```

A-36

```
   open-file filename='#ml_d(   INKS>UUCP_DIR>Public_dir>autoft    ace_info',
      portname=portname,
      access-mode=1,
      io-type=3
concatenate stuff,clly,' Failed to enter ',phnumber,' into calltrac list<BR>'

********************For Cancel*************************
      if
         not-equal cn,0
      then
concatenate stuff,clly,' Failed to remove call trace for ',rphnumber,
      ' and return ',phnumber,' back on list<BR>'
      end-if
      ******************For Cancel*********************** write-record portname,stuff
      close-file portname
exit-script
else
*********** WRITE TO FILE IN ALL STATES*************************
string-util utility='rtrim',result=clly,arg-string=neis_target_id open-file filename='#ml_d01>LINKS>UUCP_DIR>Public_dir>autoftp>trace_info',
      portname=portname,
      access-mode=1,
      io-type=3
concatenate stuff,clly,' Good Calltrace Entry ',phnumber,'<BR>'
      ********************For Cancel*************************
      if
         not-equal cn,0
      then
concatenate stuff,clly,' Good Removal of ',rphnumber,' and return of ',
phnumber,'<BR>'
      end-if
      ************************************************************
      write-record portname,stuff
      close-file portname
end-if end-script
```

```
08/26/97 13:55 edt         (nma_udac_maint)              jump:
                     UDAC Services Database Maintenance service name:       Send_page                           status: available
service provider:   process                      start options: always start
available from-     nma_udac_man screen: yes    alarm analysis: yes
security:                                           restart limit: yes
script or command line:                          start privileged: no    trace: off
send_page.on
scrolling alerter name:

queue AWP name:                              name search: per module service description:
SEND PAGE VIA SFAX SOFTWARE (AWM SFAX SEND) (UNI SFAX)

1 find   2 fwd   3 back   4 add   5 updt   6 doc   7 help   8 rfsh   9 exit  10 del
11 jump  12 pmt  13 home  14 last 15       16      17      18 edit  19      20
item found
```

A-38

```
gna script parameters (scc_gna_script)
                                                          jump:
ne language: dms100       generic issue: all
      msg type: trace_fnd    rule number: 1
field 1:                                 field 2:
compare field 1:
compare field 2:
field 1 comparator:            field 2 comparator:
      NE group:                      NE name:

script/serv: Send_page                   type: UDMC   NE channel:
   schedule:          std time zone: pst switch to daylight time? yes
         SCRIPT ARGUMENTS                  SCRIPT ARGUMENT VALUE
```

```
 1    2    3    4    5 updt  6 doc  7 help  8 rfsh  9 exit 10
11 jump 12   13 home 14 last 15     16      17      18      19
```

```
generic message analysis rule (scc_gma_rule)                    jump:

ne language: frs100          generic issue: all
  msg type: trace_fnd          rule number: 1   inhibit: no
field 1:                                        field 2:
compare field 1:
compare field 2:
field 1 comparator:          field 2 comparator:
NE group:                       NE name:

this rule is suppressed by rule number:

THRESHOLDS:
external routing     count.   window    repeat action delay        complete
trouble ticket       count.   window    repeat action delay        no
command script       count 1  window 0  repeat action delay 0      no
trunk manager        count.   window    repeat action delay        yes
scrolling alerter    count.   window    repeat action delay        no
user mail            count 1  window 0  repeat action delay 0      yes printer:
 1 find   2 fwd   3 back   4 add   5 updt   6 doc   7 help   8 rfsh   9 exit  10 del
11 jump  12 prnt  13 home  14 last  15      16       17      18       19 action
fnd complete
```

A-40

```
gna script parameters (scc_gna_script)
                                                              jump:
ne language: ewsd        generic issue: all
msg type: calltrace          rule number: 1
field 1:                          field 2:
compare field 1:
compare field 2:
field 1 comparator:         field 2 comparator:
NE group:                       NE name:

script/serv: calltrace           type: UDAC  NE channel:
schedule:                 std time zone: pst switch to daylight time? yes
        SCRIPT ARGUMENTS              SCRIPT ARGUMENT VALUE 1       2       3       4      5 updt  6 doc   7 help  8 rfsh  9 exit  10
11 jump  12      13 home 14 last 15      16      17      18      19
```

A-41

```
generic message analysis rule (scc_gma_rule)              jump:

ne language: Eusd         generic issue: all
msg type: calltrace       rule number: 1    inhibit: no
field 1:                      field 2:
compare field 1:
compare field 2:
field 1 comparator:       field 2 comparator:
NE group:                     NE name:

this rule is suppressed by rule number:

THRESHOLDS:
external routing    count      window    repeat action delay
trouble ticket      count      window    repeat action delay
command script      count 1    window 0  repeat action delay 0
trunk manager       count      window    repeat action delay
scrolling alerter   count      window    repeat action delay
user mail           count 1    window 0  repeat action delay 0 complete
printer:
  1 find   2 fwd   3 back   4 add   5 updt   6 doc   7 help   8 rfsh   9 exit  10 del
 11 jump  12 prnt 13 home  14 last 15       16      17       18       19 action
find complete
```

A-42

09/10/97 09:43 cdt                    (scc_sched_setup)          jump:

Schedule Setup job name: fall_trace                              type: process  enabled: yes
schedule type: daily            time: 040000 notify user: j803373                                       fails n  starts n  stops n setup origin: scc_sched_setup
last update by: j803373
last scheduled: 97-09-10 04:00:03 cdt
next execution: 97-09-11 04:00:00 cdt Press ENTER to continue
 1 find  2 fwd  3 back  4 add  5 updt  6 doc   7        8 rfsh  9 exit 10 del
11 jump 12     13 hme 14 last 15 orig 16      17       18      19
cap fail: (09-10 03:55) snd que que n3 01; FIRE fiRM caiyiicft:0 remote=III 09/10/97 09:59 cdt          (soc_sched_setup)
                            Schedule Process job name: call_trace command line: cd $ucpdirs/$admin/>laredonj>sched>call_trace_check.cm current dir: $s1_d01>$sysadmin>laredonj>sched output path: — module name: — schedule  class     privileged   cpu     wait    execution
class     priority  process      limit   limit   limit
C         4         no           0       0       0
                                 \— time in minutes —/

1    2    3    4    5    6    7    8    9    10
11   12   13   14   15   16   17   18   19        Press
                                                  ENTER to
                                                  continue

A-44

```
ilch1>rm call_trace.out
ready 10:00:36
ilch1>ls

Files: 3, Blocks: 3 w       1 seq    97-09-09 13:27:34   call_trace_check.cm
w       1 seq    97-09-09 14:28:14   call_trace_restart
w       1 seq    97-09-09 13:29:27   calltrace ready 10:00:38
ilch1>d call_trace_check.cm %ilch1#m1_d01>SysAdmin>langdonj>sched>call_trace_check.cm   97-09-10 10:00:46 cd
delete_file #m1_d01>LINKS>UUCP_DIR>Public_dir>autoftp>callnumber1
attach_default_output #m1_d01>SysAdmin>langdonj>call_trace_tmp
sleep -seconds 15
list #m1_d01>LINKS>UUCP_DIR>Public_dir>autoftp>callnumber1 -names_only
detach_default_output
nma_file_to_log calltrace nma_system lnma ready 10:00:46
ilch1>
```

*On running if not see it process is running if not restart and nma_system will restart process*

A-45

```
w           1 seq    97-09-09 14:28:14 call_trace_restart
w           1 seq    97-09-09 13:29:27 calltrace
ready  10:00:38
ilch1>d call_trace_check.cm %ilch1#m1_d01>SysAdmin>langdonj>sched>call_trace_check.cm
delete_file #m1_d01>LINKS>UCP_DIR>Public_dir>autoftp>callnumber1
attach_default_output #m1_d01>SysAdmin>langdonj>call_trace_tmp
sleep -seconds 15
list #m1_d01>LINKS>UCP_DIR>Public_dir>autoftp>callnumber1 -names_only
detach_default_output
nma_file_to_log calltrace nma_system lnma ready  10:00:46
ilch1>d calltrace %ilch1#m1_d01>SysAdmin>langdonj>sched>calltrace  97-09-10 10:00:58 cdt
CALL_TRACE_CHECK ready  10:00:58
ilch1>
```

What is claimed is:

1. A method for tracing a call, the method comprising steps of:

in a telecommunications network, receiving a telephone number to be traced;

establishing a call trace at a plurality of central offices of the telecommunications network using the telephone number to be traced; and on a user display device, indicating that a call has been made to the telephone number to be traced.

2. The method of claim 1 further comprising a step of:

identifying the central office of the plurality of central offices that handled the call made to the telephone number to be traced.

3. The method of claim 1 further comprising step of:

monitoring incoming calls at each central office of the plurality of central offices; and when a called number associated with an incoming call matches the telephone number to be traced, producing an indication.

4. The method of claim 3 wherein the step of producing the indication comprises a step of:

transmitting a calling number associated with the incoming call to a control office.

5. The method of claim 1 wherein the step of establishing a call trace comprises steps of:

determining a type of central office for each central office of the plurality of central offices;

creating a message for each type of central office; and transmitting to respective central offices the message of the type created for the respective central office.

6. The method of claim 5 wherein the step of transmitting the message comprises a step of:

transmitting the telephone number to be traced in the message.

7. A call tracing method comprising steps of:

in a telecommunications network, receiving a number to be traced;

identifying an office type for central offices of the telecommunication network;

formatting respective call trace messages in accordance with each respective office type; and transmitting the respective call trace messages to central offices of the telecommunications network according to respective office types to establish a call trace of the number to be traced.

8. The call tracing method of claim 7 further comprising a step of:

identifying a subset of central offices of the central offices of the telecommunications network for establishing the call trace; and formatting the respective call trace messages according to the office type of only the subset of central offices.

9. The call tracing method of claim 8 wherein identifying a subset of central offices comprises a step of:

receiving a geographic restrictor; and including in the subset of central offices only central offices of the telecommunications network in accordance with the geographic restrictor.

10. The call tracing method of claim 7 further comprising steps of:

receiving from the central offices a response message indicating success in establishing the call trace.

11. The call tracing method of claim 7 further comprising step of:

receiving an indication from a central office when an incoming call at the central office corresponds to the number to be traced.

12. The call tracing method of claim 11 wherein receiving the indication comprises steps of:

receiving a message from the central office; and reading a calling number from the message.

13. The call tracing method of claim 12 further comprising the step of:

in response to the indication, producing a user alert.

14. The call tracing method of claim 13 wherein producing a user alert comprises a step of:

communicating a page request to a paging service provider.

15. The call tracing method of claim 14 wherein communicating a page request comprises steps of:

communicating the calling number.

16. Apparatus for initiating a trace of a call, the apparatus comprising:

a user interface configured to receive and display information related to a telephone number to be traced wherein the user interface comprises:

a web page including a telephone number field for entry of the telephone number to be traced; and a network access system cooperating with the user interface to establish a call trace at a plurality of central offices of the telecommunications network using the telephone number to be traced.

17. The apparatus of claim 16 wherein the web page comprises:

a telephone number field for entry of information about the telephone number to be traced.

18. The apparatus of claim 16 wherein the web page comprises:

a geographic location field for entry of information about a geographic area to be monitored for calls made to the telephone number to be traced.

19. The apparatus of claim 16 wherein the web page comprises:

a login field for entry of information associated with a user of the apparatus.

20. The apparatus of claim 19 wherein the web page comprises:

a password entry field.

21. Apparatus for initiating a trace of a call, the apparatus comprising:

a user interface configured to receive and display information related to a telephone number to be traced;

a network access system cooperating with the user interface to establish a call trace at a plurality of central offices of the telecommunications network using the telephone number to be traced; and a processor operable in conjunction with a web browser to define the user interface.

22. The apparatus of claim 21 wherein in the user interface comprises:

an initial web page for entry of information related to the telephone number to be traced; and a confirmation web page.

23. The apparatus of claim 22 wherein the user interface further comprises:

a results web page to display results of the trace of the call.

* * * * *